United States Patent [19]

Kapsambelis et al.

[11] 3,758,752

[45] Sept. 11, 1973

[54] AUTOMATIC VEHICLE IDENTIFICATION

[75] Inventors: Christos Basil Kapsambelis, Canton; Clyde Francis Ugalde, Marlboro, both of Mass.

[73] Assignee: Computer Identics Corporation, Westwood, Mass.

[22] Filed: Aug. 26, 1970

[21] Appl. No.: 67,381

[52] U.S. Cl. 235/61.11 E, 250/219 D, 250/219 WD, 340/146.3 K, 340/146.3 Z, 340/347 NT

[51] Int. Cl. .............................................. G06k 9/18

[58] Field of Search ..................... 235/92 N, 92 MT, 235/92 DN, 92 EV, 92 NT, 92 FQ, 61.11 E; 340/347 NT, 347 DD, 174.1 H, 146.3 K, 146.3 Z; 356/156, 157, 158, 159, 160, 168; 250/219 WD, 59

[56] References Cited

UNITED STATES PATENTS

| | | | |
|---|---|---|---|
| 2,674,917 | 4/1954 | Summerhayes, Jr. | 356/160 |
| 3,546,377 | 12/1970 | Troll | 356/168 |
| 3,569,622 | 3/1971 | Mengani | 340/146.3 H |
| 3,286,233 | 11/1966 | Lesueur | 340/146.3 Z |
| 3,225,177 | 12/1965 | Stites et al. | 340/146.3 K |
| 3,188,455 | 6/1965 | Quick, Sr. | 340/347 NT |
| 3,309,667 | 3/1967 | Feissel et al. | 340/146.3 Z |
| 3,521,272 | 7/1970 | James | 340/347 |
| 3,597,752 | 8/1971 | Eldert et al. | 340/174.1 H |
| 3,304,542 | 2/1967 | Sutton et al. | 340/347 DD |
| 3,617,704 | 11/1971 | Kapsambelis et al. | 235/61.11 E |

FOREIGN PATENTS OR APPLICATIONS

| | | | |
|---|---|---|---|
| 950,102 | 2/1964 | Great Britain | 250/219 LG |
| 1,003,451 | 9/1965 | Great Britain | 340/146.3 K |
| 1,245,534 | 9/1971 | Great Britain | 340/146.3 K |

*Primary Examiner*—Maynard R. Wilbur
*Assistant Examiner*—Leo H. Boudreau
*Attorney*—Robert H. Bachman, Paul Weinstein et al.

[57] ABSTRACT

Apparatus is disclosed for determining the actual size of a section of information associated with an adjacent space by comparing an apparent dimension of the section with a like apparent dimension of the space to produce a representation of the relative size of the section and space and then determining the actual size of the section using that representation of relative size.

3 Claims, 6 Drawing Figures

Christos B. Kapsambelis
Clyde F. Ugalde
INVENTORS.
BY
Joseph S. Iandiorio
ATTORNEY Christos B. Kapsambelis
Clyde F. Ugalde
INVENTORS.
BY
Joseph S. Iandiorio
ATTORNEY.

Christos B. Kapsambelis
Clyde F. Ugalde
INVENTORS.

BY
Joseph S. Iandiorio
ATTORNEY.

Christos B. Kapsambelis
Clyde F. Ugalde
INVENTORS.

BY
Joseph S. Iandiorio
ATTORNEY.

Christos B. Kapsambelis
Clyde F. Ugalde
INVENTORS.
BY
Joseph S. Iandiorio
ATTORNEY.

AUTOMATIC VEHICLE IDENTIFICATION

FIELD OF INVENTION

This invention relates to a system for determining the size of a section of information accompanied by an adjacent space, and more particularly to such a system in which the actual size of the section is determined as a function of the relative sizes of the section and space and independently of the apparent size of the section.

BACKGROUND OF INVENTION

In one conventional mark sensing system similar to that adopted by the Association of American Railroads (AAR) described in U.S. Pat. No. 3,225,177, F. H. Stites et al., a label is used having 13 sections of information referred to as stripes. Each stripe may include one or two items or bands and each band may be colored red, blue, or white (which is read as red and blue). Each stripe contains a first band and may or may not include a second band. If the second band is not used then its band area is colored black. Those that contain both bands are referred to as wide stripes. Those that contain only the one are referred to as narrow stripes. The first stripe is a start code and is always a wide stripe as is the twelfth stripe which is the stop code. The second through eleventh stripes contain other coded information and can be either wide or narrow as can the thirteenth stripe which is a parity stripe. Each stripe is spaced from the adjacent stripes by a black space approximately equal to the width of one band. When the stripe is a narrow stripe, however, the second band is black and so the space appears two bands wide.

In each stripe the first band may assume anyone of three states as viewed by a scanner which includes a red sensor and a blue sensor: the first band may be red, blue or red and blue (white). The second band may be red, blue, red and blue (white) or neither red nor blue (black); the latter condition occurs when the band is not used and is replaced by an equal black area. The system samples the red signal and blue signal at a first predetermined time after the leading edge of the stripe is detected to test for the presence of red and of blue in the first band and at a second predetermined time after the leading edge to test for the presence of red and of blue in the second band. In order to assure the best results these two samples are generally set to occur in the middle of each band optimumly spaced from the leading and trailing edge transitions. This requires that some fixed duration be assumed for the signals from the first and second bands. This assumption works well only so long as the object carrying the label and the scanner remain at the same distance from each other. For if the object moves farther away from the scanner, i.e., a labeled railroad car sways away from the scanner or the car is narrower than the average car, then the stripes and bands, appear narrower and conversely, if the object moves closer to the scanner, i.e., a railroad car sways toward the scanner or is wider than the average car, then the stripes and bands appear wider. If the stripes appear wider, then the first band may become so much larger that it is present at the time of the second sample and the system assumes that it has viewed a wide stripe. If the stripes appear narrower, then the first and second bands may become so much smaller that the second band is not present at the time of the second sample and the system views the stripe as a narrow stripe.

Another sampling technique has provided for the first sample at a predetermined time after the leading edge of the stripe is sensed, as previously explained, but then delays the stripe signal a fixed period of time and derives the second sampling time from the trailing edge of the original stripe signal and delays it somewhat before it takes the second sample from the delayed stripe signal. The delay of the second sample and of the stripe signal are arranged such that the second sample occurs at a time when a second band would be present if a wide stripe has been scanned. However, here again the timing arrangement is designed with respect to an assumed band width which is generally but not always accurate. And again when the apparent stripe width varies at the scanner, the system may erroneously judge a narrow stripe as a wide stripe or a wide stripe as a narrow stripe.

Both techniques determine whether the stripe is a wide or a narrow stripe by means of sampling at fixed times after a leading or trailing edge of a stripe, and so both are subject to error when the apparent stripe width varies more than a predetermined amount. Generally this amount is on the order of 1:2, that is, apparent stripe widths of from one half to twice the size for which the sampling times are set are the limits of reliability of the system. Practially speaking, the tolerance is even less than 1:2, more like 1:3, because a portion of the pulse representing each band is unusable because of the unpredictable conditions that exist at the leading and trailing edge transitions. Thus a system whose optics are focused and whose sampling is aimed to operate at 6 feet may be able to read up to only 8 feet before the decrease in apparent stripe widths begins to cause errors.

SUMMARY OF INVENTION

It is therefore an object of this invention to provide a system for determining the actual size of a section of information associated with an adjacent space as a function of the relative sizes of the section and space and independently of the apparent size of the section.

It is a further object of this invention to provide a system which utilizes the apparent sizes of a stripe and its associated space to determine the actual size of the stripe and classify it as a wide or narrow stripe in terms compatible with the mark sensing systems used by the AAR and U.S. Pat. No. 3,225,177.

It is a further object of this invention to provide a system which is capable of determining the actual size of a section of information scanned over a wide range of variation in apparent section size limited only by the ability of the scanning unit to clearly present the information.

This invention features a system for determining the actual size of a section of information associated with an adjacent space. An apparent dimension of the section is compared with a like apparent dimension of the space to produce a representation of the relative sizes of the section and space. The actual size of the section is then determined from the relative sizes of the section and space.

DISCLOSURE OF PREFERRED EMBODIMENT

Other objects, features and advantages will occur from the following description of a preferred embodiment and the accompanying drawings, in which.

Figure 1:
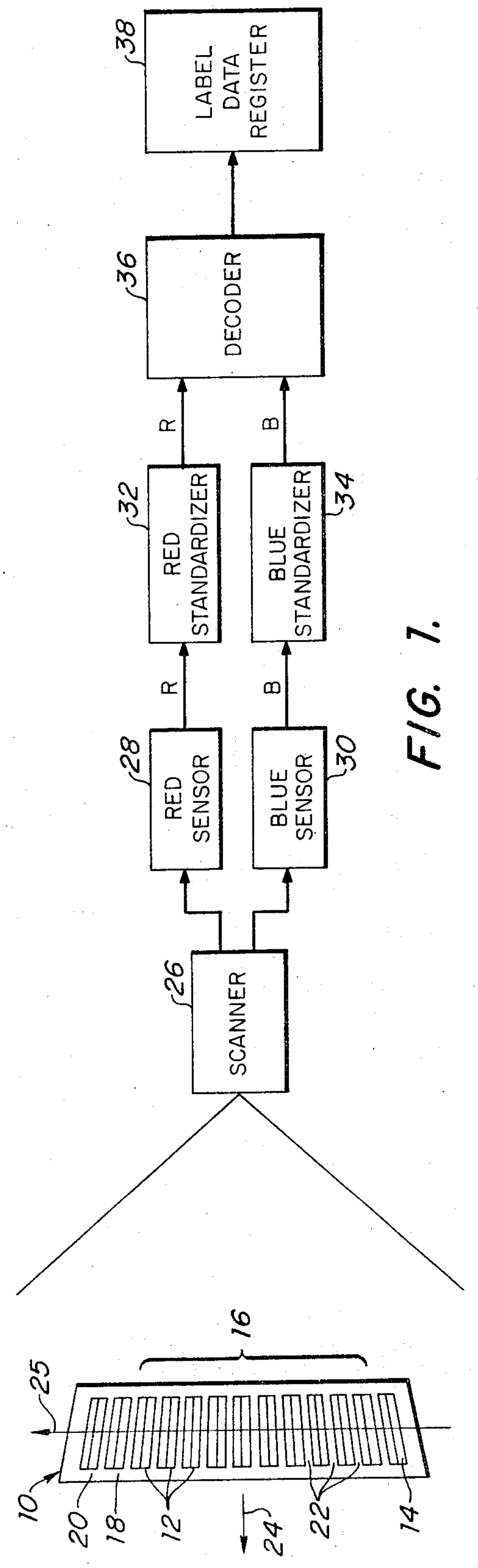
FIG. 1 is a block diagram of a system for scanning and interpreting the coded information in a label presently used by the AAR.

There is shown in FIG. 1 a mark sensing system typical of the type adopted for use by the AAR which uses a label 10 including 13 horizontal stripes 12, including a start stripe 14, 10 data stripes 16, a stop stripe 18 and parity stripe 20. The start 14 and stop 18 stripes always include two bands: the rest of the stripes have a first band and may or may not have a second band depending upon whether or not the data they encode requires the second band. Each band of a stripe may be colored red, blue or white (red plus blue). If the stripe is a narrow stripe and the second band is not used, then the second band is colored black (not red and not blue). Between each adjacent pair of stripes is a space 22 colored black which space is approximately the same width as a band. When a stripe is a narrow stripe and thus the second band is absent and colored black, this area of no information (not red and not blue) is added to the original black space following that stripe in the direction of scanning.

As the label moves horizontally, arrow 24, it is scanned vertically from bottom to top, arrow 25, by scanner 26 which is usually spaced approximately 6 feet from the average position that the labels occupy as the railroad cars pass the scanner. At this range the scanner scans a 6 foot field at the plane of the label and is capable of reliably reading the labels up to 8 feet away. Often the scanner is placed 9 feet away giving it a 9 foot vertical field at the label and making possible reading of a label up to twelve feet away. With the present invention a scanner at 6 feet has reliably read labels up to 12 and even 18 feet away and a scanner set at 9 feet has reliably read labels up to 18 or even 20 feet away.

From scanner 26 the light reflected from label 10 is submitted to a red sensor 28 and blue sensor 30. When a red or white band is scanned, red sensor 28 has a red output; when a blue or black band is scanned, it has a not-red output. Similarly, when a blue or white band is scanned, blue sensor 30 has a blue output; when a red or black band is scanned, it has a not-blue output. Since ambient conditions such as sunlight, dirty labels and the like make the output pulses from sensors 28 and 30 vary by a factor of as much as 50 or even 100 to 1, standardizers 32, 34 are used to resolve all incoming pulses to a standard signal wave form. The standardized red and blue pulses are then submitted to decoder 36 wherein it is determined whether each red pulse and blue pulse or lack of same occurs in a first band or a second band of the stripe scanned. This determination is stored in a four position storage so that the red and blue information of the first and second bands of a stripe which were scanned serially are now simultaneously present. The four bits of information are transferred upon a predetermined signal to label data register 38 which accumulates the four bits of each stripe until it contains the information extracted from all 13 stripes in 13 separate four bit stages. This information is then passed on for further processing of the data.

Figure 2:
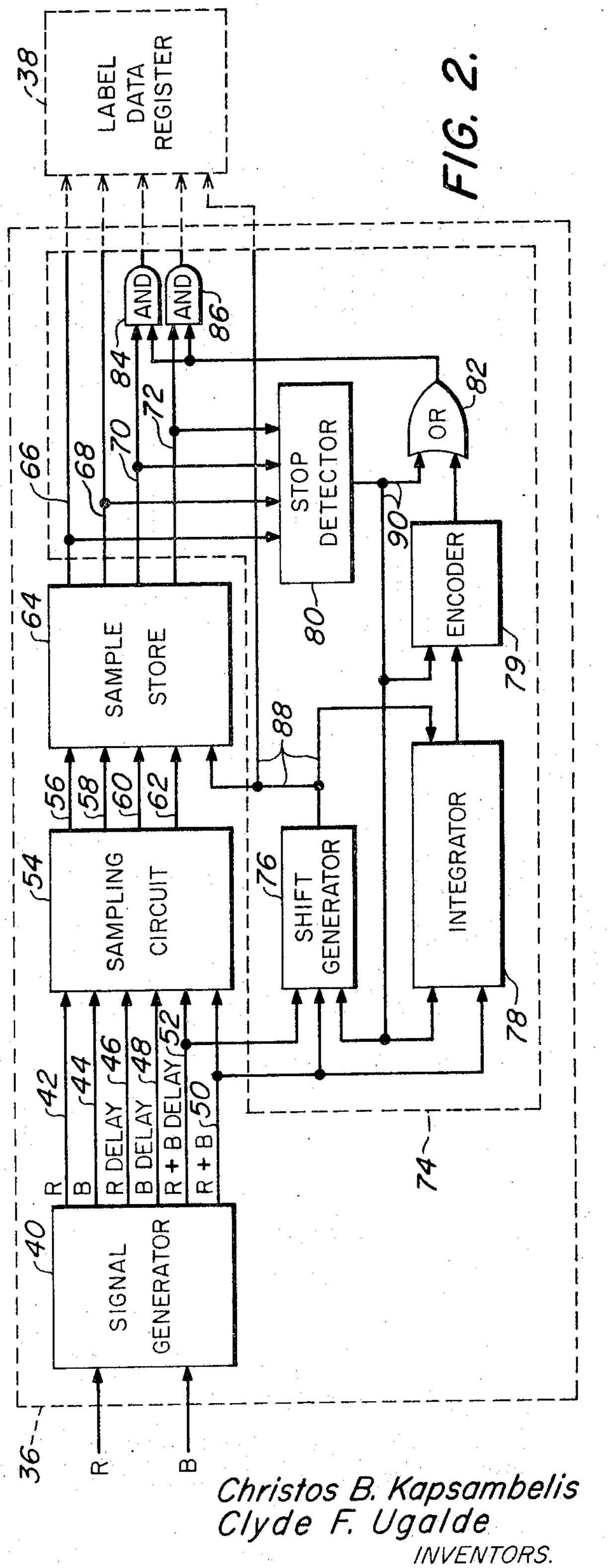
FIG. 2 is a block diagram of the decoder of FIG. 1 showing the size detector and associated circuits according to this invention.

Decoder 36, FIG. 2, includes a signal generator 40 which receives the red and blue signals from standardizers 32, 34 and provides red 42, blue 44, red delayed 46, blue delayed 48, red or blue 50, and a red or blue delayed 52 signals to sampling circuit 54. The red 42 and the blue 44 signals are sampled by sampling circuit 54 by a signal derived from the leading edge of the red or blue delayed signal 52 to determine the content of the first band of a scanned stripe and the red delayed 46 and blue delayed 48 signals are sampled at a second later time by a signal derived from the trailing edge of the red or blue signal 50. The four samples are delivered on four lines 56, 58, 60, 62 to sample store 64 where they are stored in four discrete locations.

Since in label 10 each stripe whether it be narrow or wide has a first band, the red and blue sample signals taken at the first sample time and stored in sample store 64 are always considered as valid information and so they are transferred directly to label data register 38 on lines 66, 68 upon a proper shift pulse. However, since the second band is not always present, i.e., some stripes are narrow stripes, a determination must first be made as to whether a wide stripe or narrow stripe has been scanned. If it is determined that a wide stripe was scanned then the sample signals are permitted to be transferred on lines 70, 72 along with those on lines 66, 68 to label data register 38. However, if it is determined that a narrow stripe was scanned then the sample signals taken at the second sample time are considered spurious information perhaps created by sunlight or some other accidental occurrence in the system and are prevented from entering label data register 38.

This determination of stripe width and control of the second sample signals is accomplished by a stripe size circuit 74 which includes shift generator 76, integrator 78, stop detector 80, OR circuit 82 and AND circuits 84, 86.

Circuit 74 uses means to compare the total apparent stripe width with the apparent width of the space between that stripe and the next stripe. The relative sizes of that stripe and space is then decoded to indicate whether the stripe is wide, i.e., whether the second band is absent or present. Thus this circuit makes the determination of the actual size of the stripe independently of the apparent size of the stripe as seen by the scanner. This circuit can therefore determine the actual stripe width over very large range of distances between the label and scanner.

In preferred embodiments the means for comparing includes an integrator 78 which begins its integration in a first direction upon receipt of the leading edge of red or blue signal 50 and continues integrating in that direction until signal 50 ceases and then begins integrating in the other direction during the period of the adjacent space until a signal from shift generator 76 developed from the leading edge of the red or blue signal 50 from the next stripe rests it to zero. Prior to resetting the integrand is monitored by an encoder 79. If the integrand is within one range of values the integration of the stripe has exceeded the integration of the space and the stripe is determined by the encoder to be a wide one; if it is within another range of values, the space has exceeded the stripe and the stripe is determined by the encoder to be a narrow one. If the stripe is a wide stripe a signal delivered to OR circuit 82 then enables AND circuits 84, 86 to pass the second sample signals from sample stores 64 to label data register 38. If the stripe is a narrow stripe no signal is sent to OR circuit 82 and AND circuits 84, 86 are not enabled.

Since in the mark sensing system, herein used to demonstrate this connection, the labels contain either one or two bands the task of the encoder 79 may be quite simple: Is there a second band or isn't there? Is the stripe wide or narrow? However, in more complex data processing systems used in conjunction with other label scanners or other peripheral equipment, comparisons may be made to determine whether there are no bands, one band, two bands, three bands or any other number of bands or items of information that might be contained in a stripe or section of information and encoder 79 can be set accordingly.

Shift generator 76 produces a shift pulse on lines 88 in response to the leading edge of red or blue signal 50, each time a new stripe is scanned, to reset integrator 78 to zero, and shift the samples out of sample store 64 and into label data register 38. However, when a stop stripe 18, FIG. 1, which is always a first blue band followed by a second red band, is detected by stop detector 80 it places a signal on line 90 that causes shift generator 76 to generate a shift pulse on line 88 immediately following the stripe, before the adjacent space has been scanned, to shift the sample signals from sample store 64 to label data register 38. Since stop stripe 18 is always a wide stripe the signal on line 90 is also used to enable AND circuits 84, 86 through OR circuit 82. Also simultaneously the signal on line 90 is used to reset integrator 78 not to zero but to another predetermined value, and to condition it now to integrate in the opposite direction in response to the red or blue signal 50 and absence of that signal with respect to the direction it previously integrated in response thereto. That same signal on line 90 is also used to reverse the response of encoder 79 to match the reversed performance of integrator 78. This action has been provided in order to permit the comparison or integration of the last stripe on label 10, parity stripe 20, in conjunction with the preceding black space rather than the following black space as with the other stripes because there is no defined black space following the parity stripe 20. That is, there will not be another stripe whose leading edge defines the end of the preceding black space. The sample signals from the parity stripe 20 are transferred from sample store 64 to label data register 38 by a special shift pulse on line 88 derived from the leading edge of red or blue delay signal 52 shortly after the samples have been taken.

Figure 3:
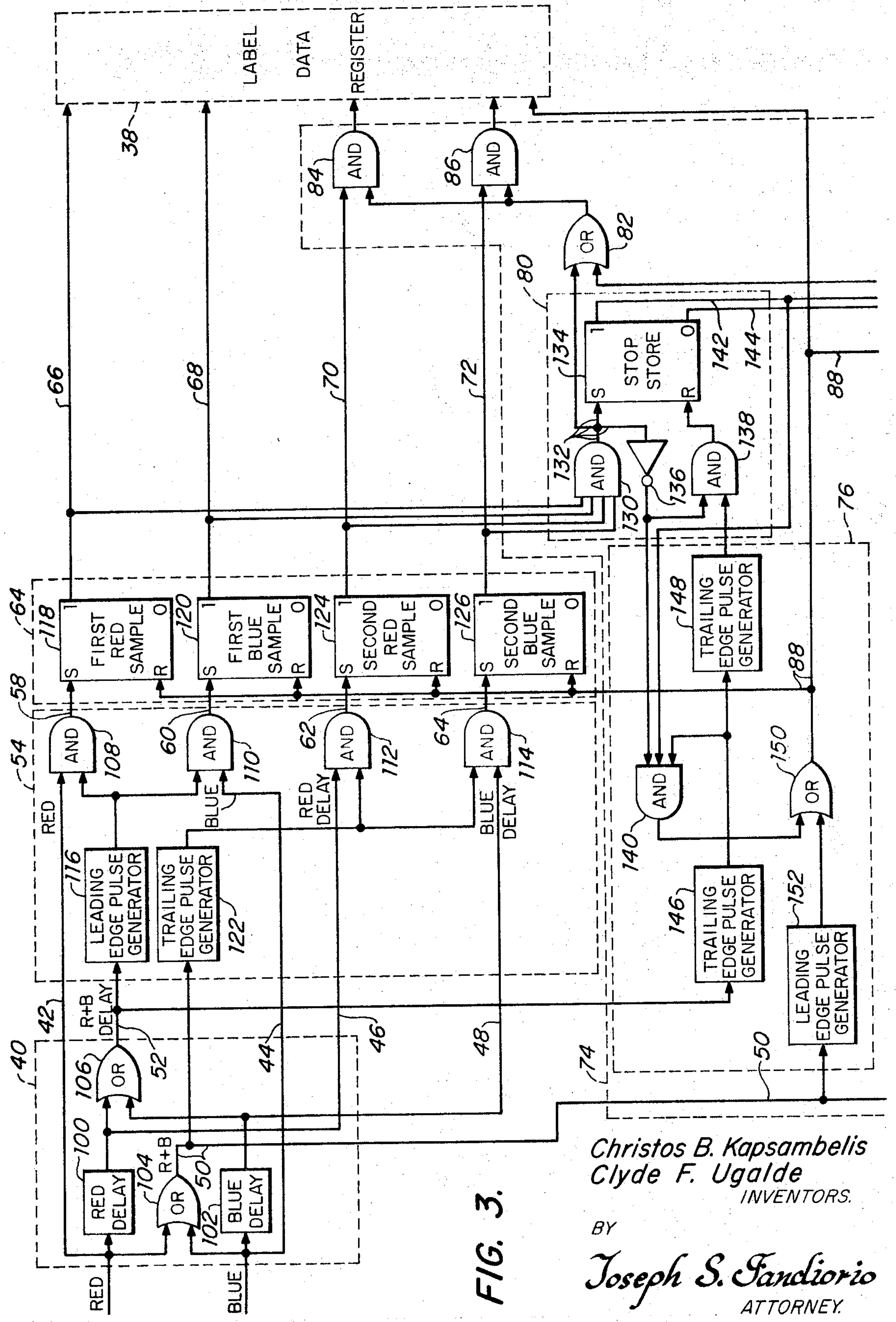
FIG. 3 is a more detailed diagram of the signal generator, sampling circuit, sample store, shift generator, and stop detector of FIG. 2.
Figure 4:
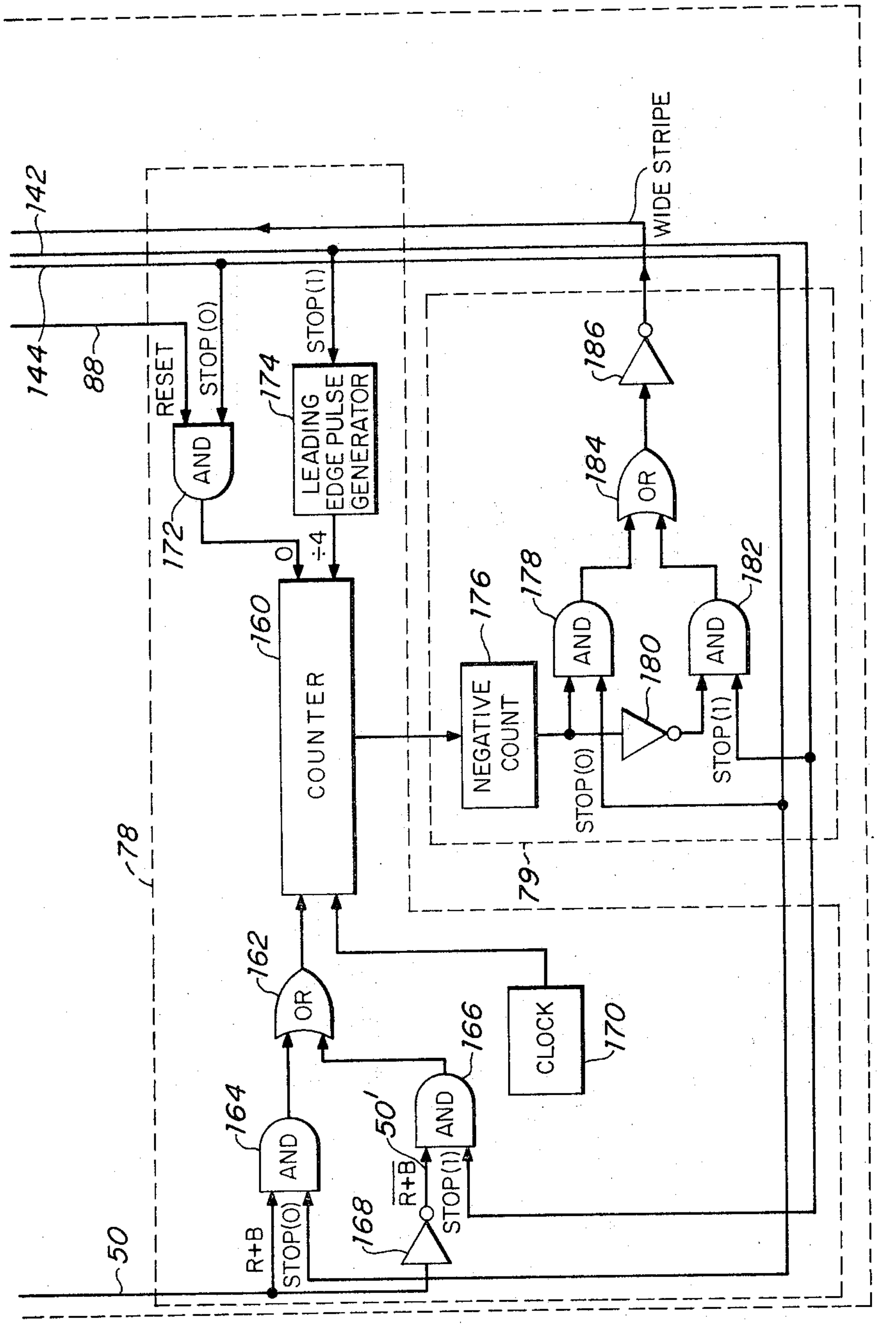
FIG. 4 is a more detailed diagram of the integrator and encoder of FIG. 2.

Circuit 74 and its interrelation with the rest of decoder 36 is shown in more detail in FIGS. 3 and 4. Signal generator 40 receives the red signal from red standardizer 32 and transmits the red signal 42, and produces the red delay signal 46 at the output of red delay circuit 100. Similarly, it receives the blue signal from blue standardizer 34 and transmits the blue signal 44, and produces the blue delay signal 48 at the output of blue delay circuit 102. The red and blue signals from standardizers 32, 34 are also supplied to OR circuit 104 to produce the red or blue signal 50 and the red delay 46 and blue delay 48 signals are directed to OR circuit 106 to produce the red or blue delay signal 52. In sampling circuit 54 the red and blue signals 42, 44 are submitted to one input of AND circuits 108, 110 and red delay and blue delay signals 46, 48 are submitted to one input of AND circuits 112, 114. The second input to AND circuits 108, 110 is derived from the red or blue delay signal 52 by leading edge pulse generator 116 to provide the first sample of red and blue signals corresponding to the first band of a stripe. At this time the sample signals representing the presence and absence of red and blue signals in the first band are stored in the first red sample flip-flop 118 and first blue sample flip-flop 120 in sample store 64. The second input to AND circuits 112, 114 is derived from the red or blue signal 50 by trailing edge generator 122 to provide the second sample of red and blue signals corresponding to the second band of a stripe. At this time the sample signals representing the presence and absence of red and blue signals in the second band are stored in the second red sample flip-flop 124 and second blue sample flip-flop 126 in sample store 54.

Stop detector 80 includes four input AND circuit 130 whose output is zero except when lines 66 and 72 are zero and lines 68 and 70 are one indicating that a first band blue, second band red is stored which combination uniquely defines the stop code. When the stop code is detected AND circuit 130 provides a one on lines 132 that enables AND circuits 84, 86 through OR circuit 82, sets stop store flip-flop 134 to the one state where its 1 output is one and its 0 output is zero and causes the output of inverter 136 to switch to zero thereby disabling AND circuit 138 and AND circuit 140 in shift generator 76. When any other stripe code is present in sample store 64, the output of AND circuit 130 is zero so that no enabling of AND circuits 84, 86 is provided, stop store flip-flop 134 is left in its zero state where its 1 output is zero and 0 output is one, and the output of inverter 136 is a one to AND circuits 138 and 140. The 1 output of flip-flop 134 on line 142 is directed to integrator 78 and encoder 79 and constitutes a second input to AND circuit 140. The 0 output of flip-flop 134 on line 144 is also directed to integrator 78 and encoder 79.

Shift generator 76 derives a timing pulse from the end of red or blue delay signal 52 a short time thereafter by trailing edge pulse generator 146 which provides the third input to AND circuit 140 and is used by trailing edge pulse generator 148 to produce a second timing pulse as an input to AND circuit 138. OR circuit 150 is driven by leading edge pulse generator 152 to produce a shift pulse on line 88 each time a new stripe is scanned; a second input to OR circuit 150 is supplied by AND circuit 140 when all of its inputs are present.

During the scanning of the first 11 stripes the output of AND circuit 130 is zero, thus AND circuits 84, 86 are not effected by it, flip-flop 134 remains in the zero state, and inverter 136 supplies a one to AND circuits 138 and 140. After the end of the red or blue delay signal 52 a first timing pulse from trailing edge pulse generator 146 supplies an input to AND circuit 140 which now has two of its three inputs. But its third input from the 1 output of flip-flop 134 in line 142 is zero and so AND circuit 140 is disabled. A short time later a second timing pulse from trailing edge pulse generator 148 provides the second input to AND circuit 138 which then resets flip-flop 134 which in turn is without any effect because flip-flop 134 is already reset.

When, however, a stop code is detected AND gates 84, 86 are enabled, flip-flop 134 is set to the 1 state and inverter 136 output is switched to zero disabling AND circuits 238, 140. During the scan of the black space following the stop stripe 18 the red and blue delay signal 52 causes a first timing pulse to be sent by trailing edge pulse generator 146 to AND circuit 140 which is already disabled by the zero output of inverter 136 and a second timing pulse from trailing edge pulse generator 148 to AND circuit 138 which is also already disabled by the zero output of inverter 136. When the leading edge of the next stripe, parity stripe 20, is sensed, the stop code stored in sample store 64 is transferred to label data register 38 by a shift pulse on line 88 derived from red or blue signal 50 by leading edge pulse generator 152. Now the output of AND circuit 130 goes to zero disabling AND circuits 84, 86 and switching the output of inverter 136 to one, thereby enabling AND circuits 138, 140: flip-flop 134 has not been reset and is still in the one state providing an enabling input to AND circuit 140. Thus after the parity information has been stored in sample store 64 the red and blue delay signal 52 causes trailing edge pulse generator 146 to produce a first timing pulse which sets the output of AND circuit 140 to one, thereby providing through OR circuit 150 a shift pulse on line 88 to transfer the parity information from sample store 64 to label data register 38. The second timing pulse from trailing edge pulse generator 148 enables AND circuit 138 to reset flip-flop 134 restoring stop code detector 80 to its normal condition in preparation for the next label scan.

In integrator 78, FIG. 4, counter 160 is set to count up when OR circuit 162 has a one output and to count down when it has zero output. During most of the scan of a label when flip-flop 134 is in the zero state its 0 output is a one and enables AND circuit 164. If then red or blue signal 50 is present at the other input of AND circuit 164, its output is one as is that of OR circuit 162 and counter 160 counts up. When red or blue signal 50 is absent or a black space or band is being scanned AND circuit 164 output is zero and counter 160 counts down. During the period when flip-flop 134 is set to its one state in response to a stop code AND circuit 164 is disabled because the 0 output of flip-flop 134 is zero. But AND circuit 166 which receives the 1 output of flip-flop 134 is now enabled. The other input to AND circuit 166 is a not red or blue signal 50' derived from red or blue signal 50 by inverter 168. Thus when a black band or space is being scanned, inverter 168 produces a red or blue signal 50 and AND circuit 166 has a one output and causes counter 160 to count up while when a stripe is being scanned, inverter 168 produces a not red or blue signal 50' and AND circuit 166 has a zero output and causes counter 160 to count down. Thus is the response of the counter to stripe and space signals reversed. Clock 170 supplies pulses to be counted to counter 160. The remainder of integrator 78 includes an AND circuit 172 which resets counter 160 to zero whenever a shift pulse on line 88 and a one from the 0 output of flip-flop 134 on line 144 are present, and a leading edge pulse generator 174 which supplies a signal to the ÷4 input of counter 160 to reset counter 160 to one fourth of its total count upon occurrence of a one on line 142 from the 1 output of flip-flop 134 when a stop code is detected.

Encoder 79 includes a negative count sensor circuit 176 which provides a one input to AND circuit 178 and a zero input via inverter 180 to AND circuit 182 when counter 160 contains a negative count and a zero input to AND circuit 178 and one input via inverter 180 to AND circuit 182 when counter 160 contains a positive count. During most of the scan flip-flop 134 is in the zero state so there is a one on line 144 from its 0 output and AND circuit 178 is enabled while AND circuit 182 is not. Upon receipt of a stop code, flip-flop 134 switches to its one state and AND circuit 178 becomes disabled while AND circuit 182 is enabled. Thus, when during the scan of a stripe and space the red or blue signal 50 is present for a longer time than it is absent, the counter counts up more than it counts down and so the count remaining in the counter after a stripe and space have been scanned is positive. This produces a zero at the output of negative sensor count 176, thus a zero at the output of OR circuit 184, but a one at the output of inverter 186 indicating that the stripe scanned was a wide stripe. Conversely, if the red or blue signal 50 is present for less time than it is absent, counter 180 counts up less than it counts down leaving a negative count in the counter after a stripe and space have been scanned. Negative sensor count circuit 176 thus produces a one, as does AND circuit 178, OR circuit and 184 but inverter 186 produces a zero indicating a narrow stripe.

When a stop code is detected AND circuit 178 is disabled and AND circuit 182 is enabled, and the inputs to OR circuit 162 are reversed. Now counter 160 counts up when red or blue signal 50 is absent and down when it is present.

Figure 5:
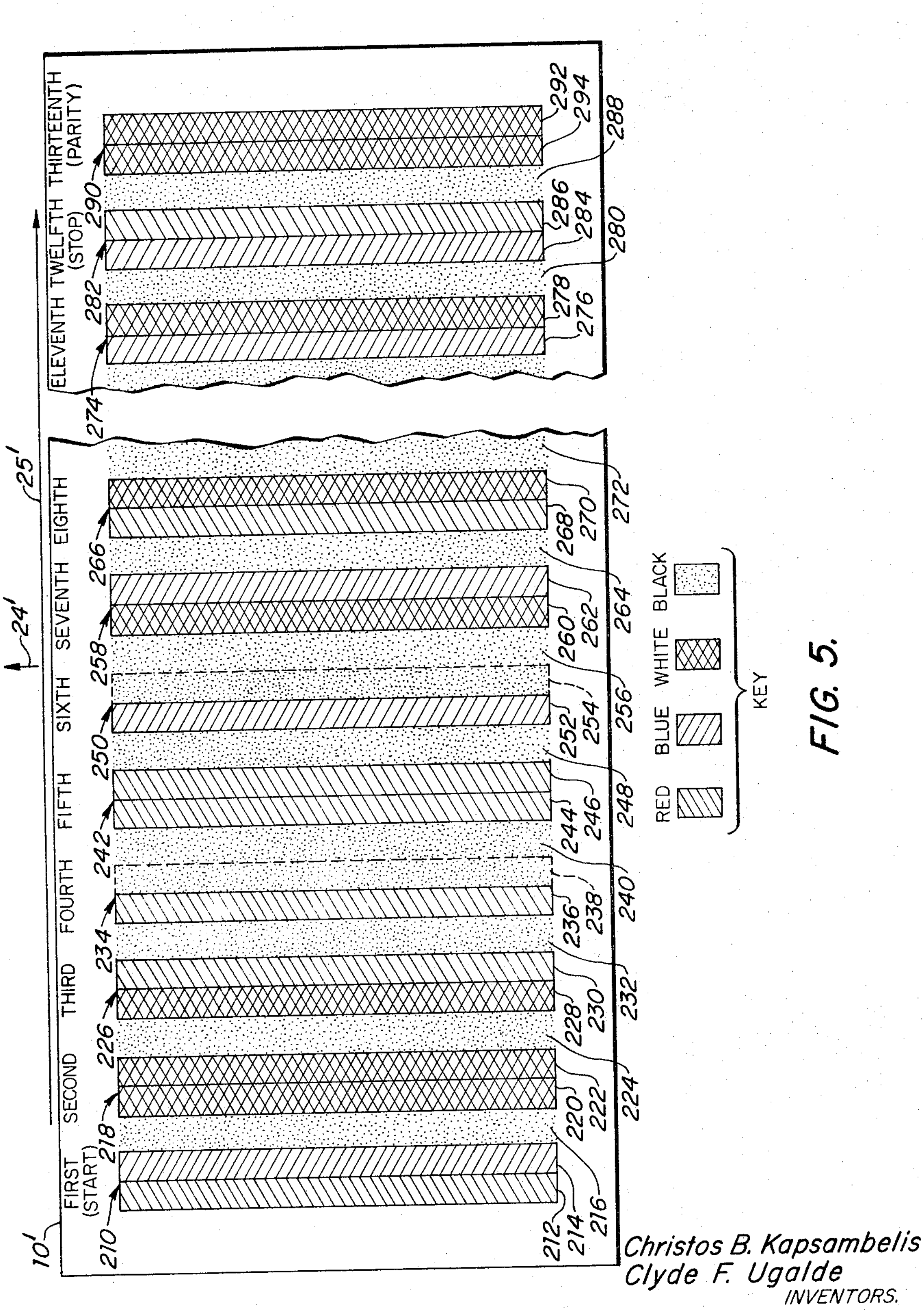
FIG. 5 shows a label similar to that shown in FIG. 1 with particular information encoded at stripes two through 11 and 13.

The operation of the system according to this invention may be better understood with reference to the scanning of a specific label 10', FIG. 5, only a portion of which is shown. Each of the stripes shown include a first band and a second band and are followed by a space. Each first band may be red, white or blue, each second band may be red, white, blue or black and the spaces are black. The key shows that red is represented by lines slanted down to the left, blue by lines slanted down to the right, white by lines slanted down to the left and to the right, and black by stippling. The rest of the label may be any color or colors and is usually black but it has not been indicated for any particular color. The direction of motion of the label past the scanner is shown by arrow 24' and of the scan of the label by arrow 25'.

First stripe 210, which includes the start code, includes a red first band 212 and a blue second band 214 followed by black space 216. Second stripe 218 includes white first band 220 and white second band 222 followed by black space 224. Third stripe 226 includes a white first band 228 and red second band 230 followed by black space 232. Fourth stripe 234 includes a red first band 236 and black second band 238 followed by black space 240. Fifth stripe 242 includes a red first band 244 and red second band 246 followed by a black space 248. Sixth stripe 250 includes a blue first band 252 and black second stripe 254 followed by a black space 256. Seventh stripe 258 includes a white first band 260 and blue second band 262 followed by black space 264. Eighth stripe 266 includes a red first band 268 and white second band 270, followed by black space 272. The ninth and tenth stripes have been eliminated in the interest of brevity. Eleventh stripe 274 includes blue first band 276 and white second band 278 followed by black space 280. Twelfth stripe 282, which includes the stop code, includes blue first stripe 284 and red second stripe 286 followed by black space 288. Thirteenth stripe 290, the parity stripe, includes white first band 292 and white second band 294 with no further reliable information following it in this label.

Figure 6:
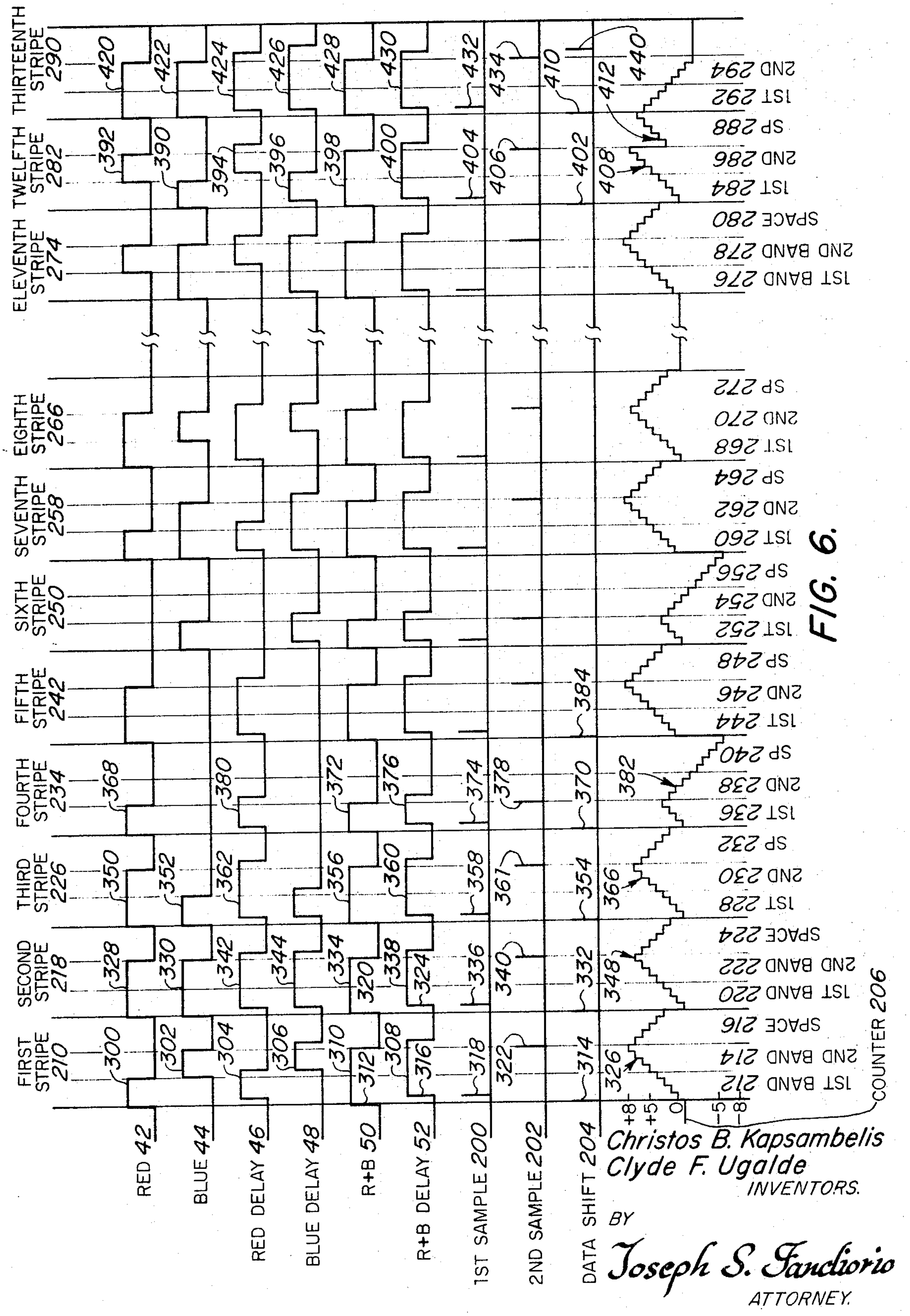
FIG. 6 is a chart of the signals occurring at different places in the diagram of FIG. 3 and FIG. 4 when the label of FIG. 5 is scanned.

Signals developed in the circuits of FIGS. 3 and 4 during a scan of label 10', FIG. 5, are shown in FIG. 6. These signals include red signal 42, blue signal 44, red delay 46, blue delay 48, red or blue (red + blue) signal 50, red or blue delay (red + blue delay) signal 52, first sample signal 200 from leading edge pulse generator 116, second sample signal 202 from trailing edge pulse generator 122, shift signal 204 in line 88, and the counter waveform 106.

As label 10' is scanned, first band 212 of stripe 210 produces a red pulse 300 but no blue pulse and signal band 214 produces a blue pulse 302 but no red pulse. From these two pulses red delay 100 and blue delay 102 produce the red delay pulse 304 and blue delay pulse 306 which are submitted to OR circuit 106 to form red + blue delay pulse 308. Red pulse 300 and blue pulse 302 are also submitted to OR circuit 104 to form red + blue pulse 310. The leading edge 312 of red + blue pulse 310 is submitted to leading edge pulse generator 152 to create shift pulse 314 on lens 88 to clear flip-flop 118, 120, 124, 126 and label data register 38 and to reset counter 160 to zero. The leading edge 316 of red + blue delay pulse 308 is submitted to leading edge pulse generator 116 to produce a first sample pulse 318 to sample the red and blue signal 42, 44 at AND circuit 108, 110 shortly after the leading edge of first band 212 has been scanned. In first band 212 that first sample pulse stores a red sample signal in flip-flop 120. The trailing edge 320 of red + blue pulse 310 is submitted to trailing edge pulse generator 122 to produce a second sample pulse 322 to sample the red delay 46 and blue delay 48 signals at AND circuits 112, 114 shortly before the trailing edge 324 of red + blue delay pulse 308. In second band 214 that second sample stores a not red sample signal in flip-flop 126. During the red + blue pulse 310 counter 160 counted up four steps per band to a total of eight steps and during the following black space 216 it counted down five steps, step signal 326, so that a count of +3 remained in counter 160 at the end of space 216 causing inverter 186 to indicate that first stripe 210 is a wide stripe and enable AND circuits 84, 86. The counter range is shown here as +8 to −8 but this is illustrative only and this low count is used for sake of simplifying the explanation. Much higher counts per band are used to obtain better resolutions.

In scanning second stripe 218 a red pulse 328 and a blue pulse 330 are each produced by both first band 220 and second band 222. The shift pulse 332 derived from the leading edge of red + blue pulse 334 resets counter 160 to zero and transfers the information stored in all four flip-flops 118, 120, 124, 126 to label data register 38. The first sample pulse 336 derived from the leading edge of red + blue delay pulse 338 samples red pulse 328 and blue pulse 330 shortly after the leading edge of first band 220 has been scanned and stores a red sample signal and a blue sample signal in flip-flop 118, 120, respectively. The second sample pulse 340 derived from the trailing edge of red + blue pulse 334 samples red delay pulse 342 and blue delay pulse 344. Thus, counter 160 first counts up eight steps and then during black space 224 it counts down five steps, step signal 348, so that a count of +3 remains in counter 160 at the end of space 224 causing a wide stripe to be detected and AND circuit 84 and 86 to be enabled.

In scanning third stripe 226 a red pulse 350 is produced by both first band 228 and second band 230 but a blue pulse 352 is produced only by first band 228. Shift pulse 354 derived from the leading edge of red + blue pulse 356 resets counter 160 to zero and transfers the information stored in all four flip-flops 118, 120, 124, 126 to label data register 38. The first sample pulse 358 derived from the leading edge of red + blue delay pulse 360 samples red pulse 350 and blue pulse 352 shortly after the leading edge of first band 228 has been scanned and stores red and blue sample signals in flip-flops 118, 120, respectively. The second sample pulse 361 samples the red delay pulse 362 shortly before the trailing edge of red + blue delay pulse 360 and stores a red sample signal and not-blue sample signal in flip-flops 124, 126, respectively. Since blue delay pulse 364 is produced only by first band 228, there is no blue pulse present concurrent with the second sample pulse 361. During red + blue pulse 356 counter 160 counts up eight steps and during black space 232 it counts down five steps, step signal 366. The remainder of +3 indicates a wide stripe and causes AND circuits 84, 86 to be enabled.

In scanning fourth stripe 234 a red pulse 368 is produced from first band 236 and no pulse is produced by second band 238 because it is black. Shift pulse 370 derived from the leading edge of red + blue 372 resets counter 160 and transfers the information stored in all four flip-flops 118, 120, 124, 126 to label data register 30. The first sample pulse 374 derived from the leading edge of red + blue delay pulse 376 samples red pulse 368 shortly after the leading edge of first band 236 has been scanned and stores a red sample signal in flip-flop 118 and a not-blue sample signal in flip-flop 120 because there is no blue pulse produced by first band 236. The second sample pulse 378 derived from the trailing edge of red + blue pulse 372 now samples the red delay pulse 380 shortly before the trailing edge of red + blue delay pulse 376 and stores a red sample signal in flip-flop 124 and not-blue sample signal in flip-flop 126. However, this second sample erroneously sampled the red delay pulse 380 derived from red pulse 368 upon scanning of the first band 236 but the information from this first band 236 has already once been stored in flip-flops 118, 120 in response to first sample 374: the system has stored the information from the first and only band in the fourth stripe 234 as if it were a wide stripe, i.e., contained two bands of red, blue, or white. However, this condition is detected and remedied by this invention because during the red + blue pulse 372 counter 160 counted up only four steps but during the second band which was black it counted down four steps and then continued to count down five more steps during black space 240, step signal 382. Thus the remainder in counter 160 is now −5 and this negative number causes the output of inverter 186 to indicate that fourth stripe 234 is a narrow stripe whereby AND circuits 84, 86 are disabled. Now when the shift pulse 384 derived from the leading edge of fifth stripe 242 occurs, only the information in flip-flops 118, 120 is transferred to label data register 38; the information from flip-flops 124, 126 is blocked by AND circuits 84, 86. The system continues to operate in this manner as it reads fifth stripe 242, sixth stripe 250, seventh stripe 258, eighth stripe 260, ninth and tenth stripes, not shown, and the eleventh stripe 274.

Twelfth stripe 282 contains the stop code which is always a blue first band 284 and red second band 286. In scanning twelfth stripe 282 a blue pulse 390 is produced by first band 284 and red pulse 392 is produced by second band 280. The red delay pulse 394, blue delay pulse 396, red + blue pulse 398, and red + blue delay pulse 400 shift pulse 402, first sample 404, second sample 406 and step signal 408 are all developed and perform in the usual manner as previously described. However, stop detector 80 senses the stop code in flip-flops 118, 120, 124, 126 causing AND circuit 130 to enable AND circuits 84, 86, and setting flip-flop 144 to its one state, which via line 144 disables AND circuit 172 so that counter 160 will not be reset to zero by the shift pulse 410 derived from the leading edge of thirteenth stripe 290, and via line 142 drives leading edge pulse generator 174 to reset counter 160 to one fourth of its capacity or two counts, step signal 412. Thus the step signal 408 operative through the first band 184 and second band 286 of twelfth stripe 282 has been stopped abruptly before it could count down for the black space 288 and determine whether the twelfth stripe 282 is wide or narrow. But this does not matter for a stop code is known always to be a wide stripe and stop detector 80 has already enabled AND circuits 84, 86. The signals on lines 142, 144 have simultaneously also reversed the response of counter 160 through AND circuits 164, 166 so that counter 160 counts up on black and down on red + blue and have reversed the response of stripe width detector 79 through AND circuits 178, 182 so that it responds to a positive count as a narrow stripe and negative count as a wide stripe.

Now with the stop code, counter 160 is counting up during black space 288 beginning at +2 rather than zero. This preset is positive and only two steps but may be either positive or negative and may be more or less than two. The preset is used to insure that a decision point does not occur at a boundary condition, in this embodiment zero. The direction and amount of the preset depends on the response of the counter and the relative values of decision points and boundary or boundaries. When thirteenth stripe 290 is reached the white first band 292 and white second band 294 each produce a red pulse 420 and blue pulse 422 from which are developed the red delay pulse 424, blue delay pulse 426, red + blue pulse 428, red + blue delay pulse 430, and first and second samples 432, 434. Shift pulse 410 transfers the stop code information in flip-flops 118, 120, 124, 126 to label data register 38 but does not reset counter 160 to zero. Rather counter 160 now begins to count down in response to red + blue pulse 428, and at the end of thirteenth stripe 290 has counted up five steps from +2 to +7 then down eight steps from +7 to −1. This count now produces a wide stripe indication at the output of inverter 186 and enables AND circuits 84, 86. With the transfer of the stop code,AND circuit 130 is disabled and inverter 136 has its output at one. Thus the pulse developed by trailing edge pulse generator 146 from red + blue delay 430 supplies the needed third input to AND circuit 140 to produce the special shift pulse 440 on line 88 to transfer the information sensed from thirteenth stripe 290 from flip-flops, 118, 120, 124, 126 to label data register 38, and reset counter 160 to zero. The system is now ready to begin another label scanning cycle.

An incremental integrator, counter 160, is used here for purposes of illustration only, for linear integrators and various other implementations may be used, and means other than integrators may be used to compare the red + blue width with that of the black space. The invention is not limited to comparing red + blue with black: any color or combination of colors may be so compared, and the application of this invention is not even limited to comparing different colored stripes. The invention may be used to compare any two or more qualities and to any such qualities whether in the form of stripes or any other shaped areas.

The reversal of integration following the stop code is accomplished in order to obtain a width indication of the thirteenth stripe which lacks a following black space. But operation in the reverse mode may be made the typical operation of the system in some applications. The invention is not limited to a determination of whether a three unit area contains one or two items of a first class relative to one item of a second class. The first class may include any number of items as may the second class; the encoder 79 will then require more logic circuitry to decide whether one of three, four or more indications exist in contrast to the simple example of this embodiment wherein the decision is simple: Is it narrow or is it wide? Is there one band or two? The specific embodiment disclosed is particularly designed for operation in a system such as shown in U.S. Pat. No. 3,225,171 for reading the AAR standard labels and so the details of the structure and operation of the invention have been arranged to suit that need, but the invention has much broader application in many types of identification systems and other systems.

Other embodiments will occur to those skilled in the art and are within the following claims.

What is claimed is:

1. In an optical reading system for reading coded information including code elements, each code element, having a first part having a first optical characteristic and a second part having a second optical characteristic distinguishable from said first characteristic, in which the distance between the reading system and coded elements may vary, a discrimination system for determining the size of said parts independently of the distance of the code elements from the reading system comprising:

means for scanning said code elements;

means, responsive to said means for scanning, for producing a first signal in response to the scanning of a said first part and a second signal in response to the scanning of a said second part;

integrating means for integrating in a first direction and in the opposite direction and having means for accumulating the remaining sum of the integration;

gating means responsive to said first signal to operate said integrating means in said first direction and responsive to said second signal to operate said integrating means in said opposite direction;

means, responsive to said integrating means for producing a first output in response to said remaining sum being in a first range and a second output in response to said remaining sum being in a second range; and means, responsive to said first output for determining that said first part is smaller than said second part and responsive to said second output for determining that said first part is larger than said second part.

2. The discriminator system of claim 1 in which said integrating means is a digital integrator and includes a bidirectional counter.

3. The discriminator system of claim 1 in which one of said first and second range includes a range of positive values and the other a range of negative values and said means for producing a first output in response to said remaining sum being in a first range and a second output in response to said remaining sum includes means for detecting whether said remaining sum is a positive or a negative value.

* * * * *